(12) United States Patent
Shan

(10) Patent No.: US 9,077,929 B2
(45) Date of Patent: Jul. 7, 2015

(54) PORTABLE ELECTRONIC DEVICE BASED USER-DEFINABLE REMOTE-CONTROL INTERFACE SYSTEM AND OPERATING METHOD THEREOF WITH A DISPLAY AND INPUT UNIT ADAPTED TO SHOW AN INTERFACE ALLOCATION INFORMATION MAP, THE MAP BEING DIVIDED INTO A PLURALITY OF SUB-AREAS

(75) Inventor: Chih-Heng Shan, New Taipei (TW)

(73) Assignee: ASIA VITAL COMPONENTS CO., LTD., New Taipei (TW)

( * ) Notice: Subject to any disclaimer, the term of this patent is extended or adjusted under 35 U.S.C. 154(b) by 215 days.

(21) Appl. No.: 13/612,881

(22) Filed: Sep. 13, 2012

(65) Prior Publication Data

US 2014/0070926 A1   Mar. 13, 2014

(51) Int. Cl.
| | |
|---|---|
| *G08B 21/00* | (2006.01) |
| *H04N 5/44* | (2011.01) |
| *H04N 21/41* | (2011.01) |
| *H04N 21/422* | (2011.01) |

(52) U.S. Cl.
CPC ......... *H04N 5/4403* (2013.01); *H04N 21/4126* (2013.01); *H04N 21/42208* (2013.01); *H04N 2005/441* (2013.01); *H04N 2005/4423* (2013.01); *H04N 2005/4439* (2013.01); *H04N 2005/4441* (2013.01); *H04N 21/4222* (2013.01); *H04N 21/42224* (2013.01); *H04N 21/42228* (2013.01)

(58) Field of Classification Search
CPC ........... G08C 2201/20; G08C 2201/92; G08C 17/02; G08C 19/28; G08C 2201/21
USPC ........ 340/426.13, 426.14, 4.11, 12.22–12.26; 341/176; 348/734
See application file for complete search history.

(56) References Cited

U.S. PATENT DOCUMENTS

| | | | |
|---|---|---|---|
| 2003/0189509 A1* | 10/2003 | Hayes et al. .................. | 341/176 |
| 2004/0070491 A1* | 4/2004 | Huang et al. ................. | 340/10.5 |
| 2006/0152401 A1* | 7/2006 | Spilo ............................. | 341/176 |
| 2008/0297372 A1* | 12/2008 | Wouters .................. | 340/825.69 |
| 2009/0231178 A1* | 9/2009 | Letourneur et al. ......... | 341/176 |
| 2011/0012710 A1* | 1/2011 | Sullivan et al. .............. | 340/5.64 |

* cited by examiner

*Primary Examiner* — Mark Rushing

(57) ABSTRACT

A portable electronic device based user-definable remote-control interface system and operating method thereof is disclosed. The system integrates remote control information of a variety of remotely controllable devices into one single interface allocation information map, which is stored in and can be shown on a portable electronic device. To operate the user-definable remote-control interface, first show the interface allocation information map on the portable electronic device and define at least an object and a button in the map. Then, search a network platform for a built-in remote-control code that corresponds to the button, or receive a learning signal from a remote controller of a device to be remotely controlled with the button to generate a learnt remote-control code corresponding to the button. Finally, store the built-in or the learnt remote-control code in a storage unit of the portable electronic device and relate the remote-control code to its corresponding button.

8 Claims, 12 Drawing Sheets

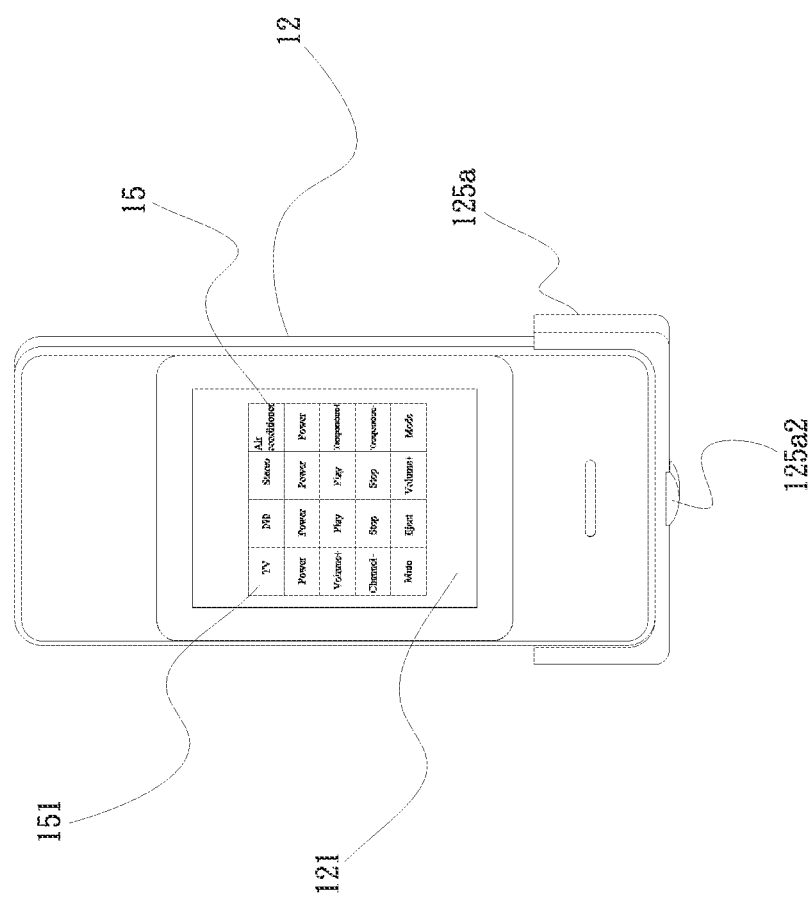

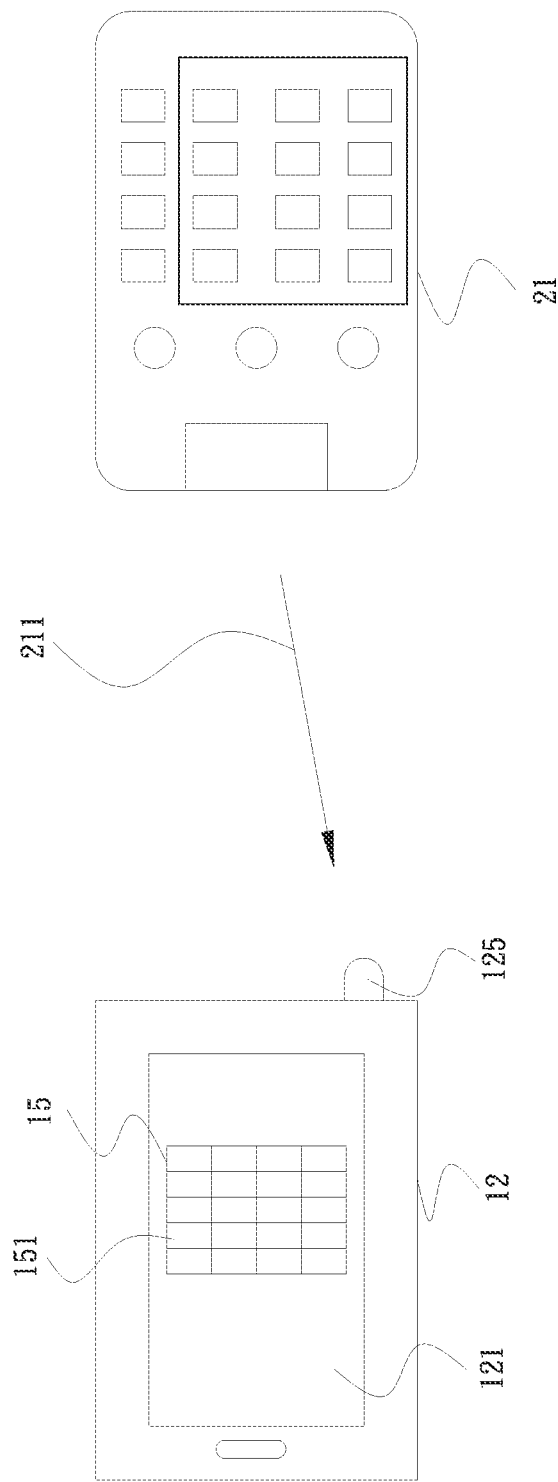

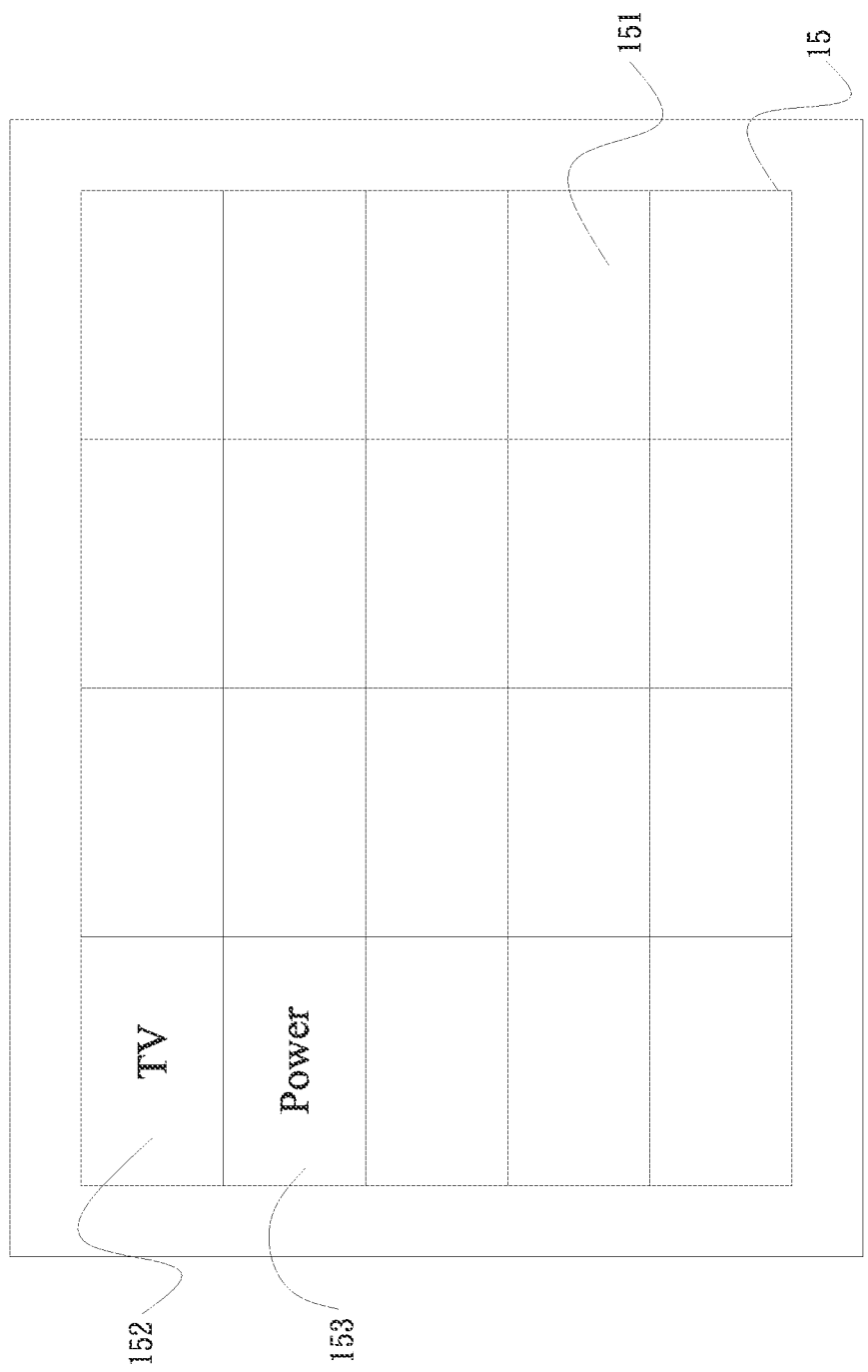

PORTABLE ELECTRONIC DEVICE BASED USER-DEFINABLE REMOTE-CONTROL INTERFACE SYSTEM AND OPERATING METHOD THEREOF WITH A DISPLAY AND INPUT UNIT ADAPTED TO SHOW AN INTERFACE ALLOCATION INFORMATION MAP, THE MAP BEING DIVIDED INTO A PLURALITY OF SUB-AREAS

FIELD OF THE INVENTION

The present invention relates to a user-definable remote-control interface system and operating method thereof, and more particularly to a portable electronic device based user-definable remote-control interface system and operating method thereof that integrates remote control information of a variety of remotely controllable devices into one single remote-control interface on a portable electronic device.

BACKGROUND OF THE INVENTION

Remote controllers are developed in response to people's demands for convenient control of different articles and appliances. Currently, most of the general electric appliances, such as television (TV) sets, air conditioners, domestic audio/visual (AV) apparatus and fans, all are provided along with a specific remote controller therefor, so that users may conveniently control these electric appliances from a remote location with their respective remote controllers.

According to some statistical data, modern people watching TV will switch from one channel to another channel within less than fifteen minutes in average. Meanwhile, it is also found more and more consumers of different ages use various kinds of AV apparatus for largely extended time everyday. All these facts reflect that remote controllers are deeply relied on by modern people.

The currently available remote controllers for various electric and electronic devices are different in specifications. The manufacturers of different electric and electronic products design the remote controllers only for use with their own products. Each type of remote controller uses a unique infrared frequency to remotely control its corresponding electric, electronic or AV product. Thus, remote controllers for different products are not exchangeable for use with other products. Even the remote controllers for different products manufactured by different departments of the same manufacturer are not exchangeable for use.

In view that various kinds of portable electronic devices, such as the smartphones, are now widely used by and carried about with most people in the modern society, it would be highly appreciated if such portable electronic devices can be used to replace the conventional remote controllers for remotely controlling electric, electronic and AV products of different types, brands and models. By using a portable electronic device also as a device to remotely control various electric, electronic and AV products, a lot of resources consumed for manufacturing different remote controllers for different products can be saved and the rate of replacement of remote controllers can be reduced to meet the requirement of environmental protection.

It is therefore tried by the inventor to develop a portable electronic device based user-definable remote-control interface system and operating method thereof, in order to eliminate the problems with the conventional remote controllers.

SUMMARY OF THE INVENTION

A primary object of the present invention is to provide a system and operating method that integrates remote control information of a variety of remotely controllable devices into one single remote-control interface.

Another object of the present invention is to provide a user-definable remote-control interface system and operating method thereof to meet individual users' personal requirements.

A further object of the present invention is to provide a remote-control interface system and operating method thereof that allows a user to remotely control a variety of remotely controllable devices via one single portable electronic device.

A still further object of the present invention is to provide a portable electronic device based user-definable remote-control interface system and operating method thereof that provides excellent convenience in use.

To achieve the above and other objects, the portable electronic device based user-definable remote-control interface system according to a feasible embodiment of the present invention includes a network platform having a plurality of remote-control codes of a variety of remotely controllable devices stored thereat; and a portable electronic device wirelessly linked to the network platform. The portable electronic device includes a display and input unit, a storage unit, and processing unit. The display and input unit can show an interface allocation information map, which is divided into a plurality of sub-areas. At least one of the sub-areas is defined as an object and at least another one of the sub-areas is defined as a button. Each sub-area being defined as a button is assigned with some attributes. According to the attributes assigned to a button, the system searches the network platform for a built-in remote-control code that corresponds to the button and downloads the corresponding built-in remote-control code. The storage unit is electrically connected to the display and input unit for storing the interface allocation information map and the downloaded built-in remote-control code, and relating the built-in remote-control code to its corresponding button. The processing unit is electrically connected to the display and input unit as well as the storage unit for converting a built-in remote-control code corresponding to a specific button into a first remote-control signal.

The system according to the present invention further includes a wireless transceiver module connected to the portable electronic device. The wireless transceiver module can be an infrared transceiver module or a radio transceiver module capable of transmitting a remote-control code stored in the portable electronic device and receiving a learning signal from a learning object. The processing unit converts the received learning signal into a learnt remote-control code for storing in the storage unit and relating it to a corresponding button. The processing unit also converts the learnt remote-control code into a second remote-control signal.

To achieve the above and other objects, the method of operating portable electronic device based user-definable remote-control interface according to the present invention includes the steps of showing an interface allocation information map on a display and input unit of a portable electronic device, selecting at least one of many sub-areas in the interface allocation information map and defining the selected sub-area as an object or a button; searching a network platform for one of many built-in remote-control codes stored in the network platform that corresponds to a button defined at the selected sub-area; downloading and storing the corresponding built-in remote-control code in a storage unit of the portable electronic device; and relating the built-in remote-control code to its corresponding button.

More specifically, the portable electronic device based user-definable remote-control interface operating method according to the present invention further includes the steps of assigning a name to each selected sub-area and deciding whether to assign a remote-control code to the selected sub-area; if yes, defining the selected sub-area as a button; or if not, defining the selected sub-area as an object and deciding whether to select a next sub-area in the interface allocation information map. After the step of defining the selected sub-area as a button, the method further includes a step of assigning attributes to the button, and the step of searching the network platform for a corresponding built-in remote-control code is performed based on the attributes assigned to the button. In the case a corresponding built-in remote-control code is found, the step of downloading the corresponding built-in remote-control code is performed. On the other hand, in the case no corresponding built-in remote-control code is found, the method further includes a step of entering into a learning mode, in which a wireless transceiver module receives a learning signal and a processing unit of the portable electronic device converts the received learning signal into a learnt remote-control code and stores the latter in the storage unit of the portable electronic device. Thereafter, the step of storing and relating the corresponding built-in remote-control code or the learnt remote-control code to its corresponding button is performed. After the step of storing and relating the remote-control code to its corresponding button, a further step of deciding whether to select a next sub-area is performed; if yes, the step of selecting a sub-area is repeated; or if not, the operating method is ended.

In the learning mode, the wireless transceiver module receives the learning signal from a learning object, and the processing unit converts the learning signal into a learnt remote-control code. The object to be learned is a remote controller of a device to be remotely controlled via the system of the present invention.

The network platform can be a server. The attributes assigned to each button can include, for example, the type of a device to be remotely controlled, the brand of the selected device type, and the model of the selected device brand.

According to the operating method of the present invention, the step of assigning attributes to a button further includes the steps of selecting a device type that corresponds to the device to be remotely controlled with the button; selecting a device brand that corresponds to the device type selected in the previous step; and selecting a device model that corresponds to the device brand selected in the previous step.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein

FIG. 3A shows a portable electronic device and a separable wireless transceiver module for the system of the present invention in an assembled state;

FIG. 5 is a conceptual view showing the system of the present invention in a learning mode;

FIGS. 6A to 6E are conceptual views showing the flow process of the portable electronic device based user-definable remote-control interface operating method according to the present invention.

DETAILED DESCRIPTION OF THE PREFERRED EMBODIMENTS

Figure 1:
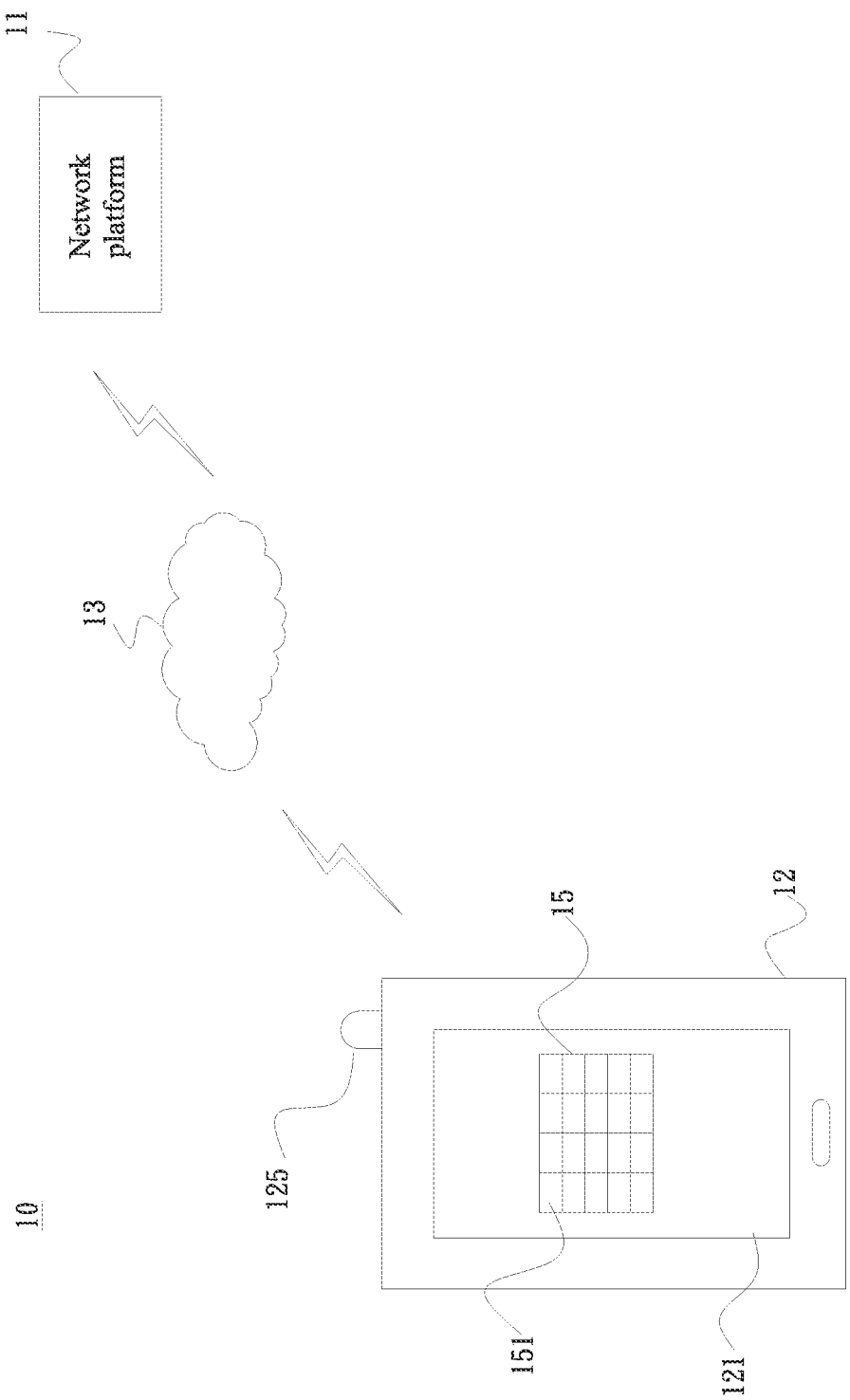
FIG. 1 is a conceptual view of a portable electronic device based user-definable remote-control interface system according to the present invention.

The portable electronic device based user-definable remote-control interface system and operating method thereof according to the present invention will now be described with some preferred embodiments thereof and with reference to the accompanying drawings. For the purpose of easy to understand, elements that are the same in the preferred embodiments are denoted by the same reference numerals.

Please refer to FIG. 1 that is a conceptual view of a portable electronic device based user-definable remote-control interface system 10 according to the present invention. As shown, the system 10 includes a network platform 11 and a portable electronic device 12 wirelessly linked to the network platform 11 via a network, such as the Internet.

The network platform 11 can be but not limited to a server and includes a database that stores a large number of built-in remote-control codes for a variety of remote-controllable devices of different types, brands and models.

Figure 2:
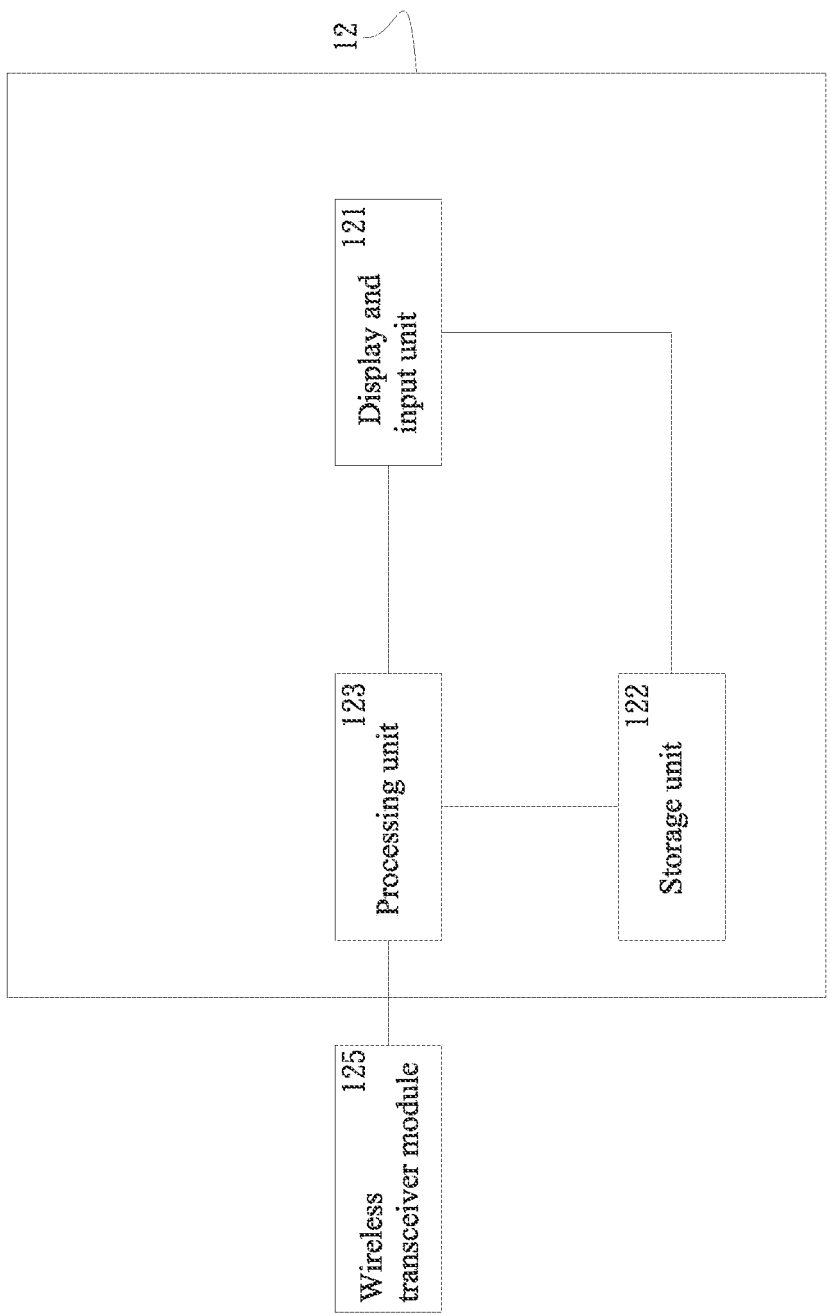
FIG. 2 is a block diagram of a portable electronic device and a wireless transceiver module included in the system of the present invention.

Please also refer to FIG. 2 that is a block diagram of the portable electronic device 12. As shown, the portable electronic device 12 includes a display and input unit 121, a storage unit 122 electrically connected to the display and input unit 121, and a processing unit 123 electrically connected to the display and input unit 121 as well as the storage unit 122.

The display and input unit 121 can show an interface allocation information map 15. The interface allocation information map 15 is divided into a plurality of sub-areas 151. Each of the sub-areas 151 can be defined as an object or a button. In the case a selected sub-area is defined as a button, attributes can be assigned to the button and the network platform 11 can be searched according to the assigned attributes for a built-in remote-control code that corresponds to the button. The steps of defining the sub-areas 151 will be described in more details latter herein. While the interface allocation information map 15 shown in the illustrated embodiments has a rectangular configuration and includes total 20 sub-areas arrayed in four columns and five rows, it is understood the interface allocation information map 15 according to the present invention is not necessarily implemented as a rectangular configuration and divided into twenty sub-areas but can be shown as any other shape or pattern or in any other manner according to actual needs.

The display and input unit 121 can be a liquid crystal display (LCD), a plasma display, a light-emitting-diode (LED) display, a field-emission display, an organic light-emitting-diode (OLED) display, an active matrix organic light-emitting-diode (AMOLED) display or any other suitable type of display, and is constructed as a resistive, a capacitive, a pressure-sensitive, an infrared, a surface acoustic wave (SAW) or any other suitable type of touch screen, so as to receive a user's input thereat.

The storage unit 122 stores the interface allocation information map 15, a plurality of built-in remote-control codes, and at least one learnt remote-control code; and the stored built-in remote-control codes and learnt remote-control codes are respectively related to a corresponding button defined in the interface allocation information map 15. The storage unit 122 can be but not limited to a memory, such as a random-access memory (RAM), a dynamic random-access memory (DRAM) or a read-only memory (ROM), or a memory card, such as an SD card memory or a micro SD card memory.

The processing unit 123 relates the built-in remote-control codes or the learnt remote-control codes stored in the storage unit 122 to their respective corresponding button defined in the interface allocation information map 15. The processing unit 123 also converts each built-in remote code into a first remote-control signal and each learnt remote-control code into a second remote-control signal. The processing unit 123 can be but not limited to a central processing unit (CPU) or a microcontroller unit (MCU).

The portable electronic device 12 has a wireless transceiver module 125 connected thereto. According to a preferred embodiment, the wireless transceiver module 125 is built in the portable electronic device 12, as shown in FIGS. 1 and 5. The wireless transceiver module 125 can be but not limited to an infrared transceiver module or a radio transceiver module, such as a radio frequency transceiver module or a laser transceiver module, for receiving a learning signal 211 generated by a learning object 21. The processing unit 123 converts the learning signal 211 into a learnt remote-control code and stores the learnt remote-control code in the storage unit 122. Either the first remote-control signal or the second remote-control signal mentioned above is transmitted via the wireless transceiver module 125 to a corresponding device to be remotely controlled.

Figure 3B:
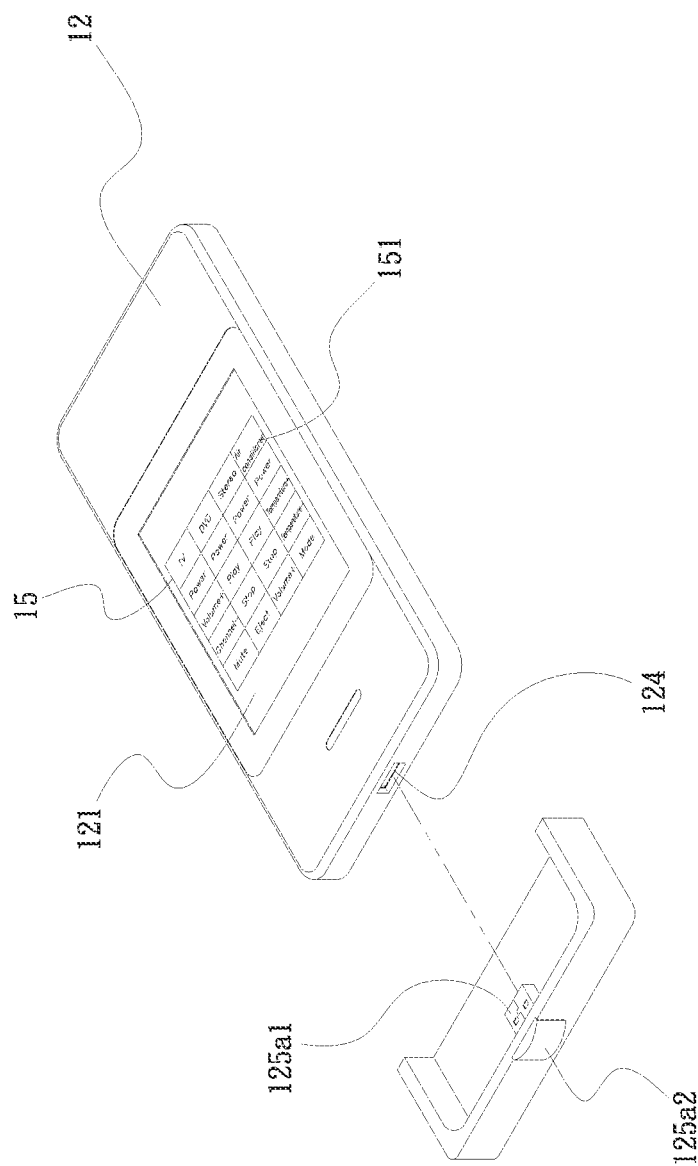
FIG. 3B is an exploded view of FIG. 3A.

According to another embodiment of the present invention as shown in FIGS. 3A and 3B, an independent wireless transceiver module 125*a* is separably electrically docked with the portable electronic device 12 and accordingly, electrically connected to the processing unit 123, as shown in FIG. 2. The electrical docking between the independent wireless transceiver module 125*a* and the portable electronic device 12 can be achieved by hot plugging, electrical coupling or electrical clamping.

The wireless transceiver module 125*a* includes a case, a sleeve or a barrel provided with a connector 125*a*1 and a transmitting element 125*a*2. The connector 125*a*1 is arranged on one side of the wireless transceiver module 125*a* for correspondingly engaging with a mating connector 124 provided on the portable electronic device 12.

The connector 125*a*1 has a connection specification matching that of the mating connector 124, and can be, but not limited to, a universal serial bus (USB) connector, a micro USB connector, a mini USB connector, a serial advanced technology attachment (serial ATA or SATA) connector, an external SATA (e-SATA) connector, an RJ-45 connector, a high-definition multimedia interface (HDMI) connector, a dock connector, such as any one of Apple 30-pin iPhone dock, iPod dock and iPad dock, or a 3.5 mm earphone jack.

The transmitting element 125*a*2 can be an infrared transceiver element or a radio transceiver element.

Figure 4:
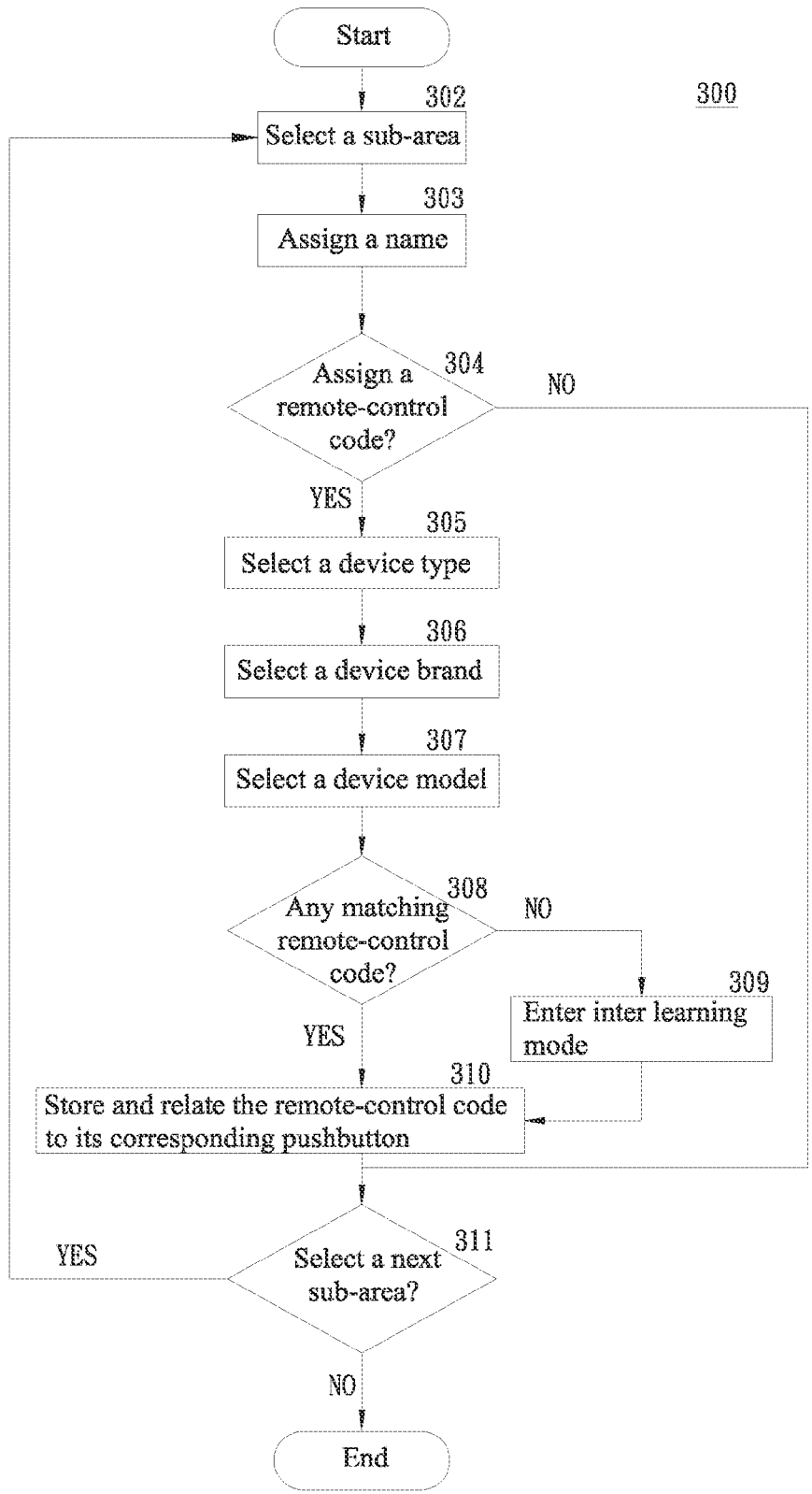
FIG. 4 shows a flow process of a portable electronic device based user-definable remote-control interface operating method according to the present invention.

Please refer to FIG. 4 that shows a flow process 300 of the portable electronic device based user-definable remote-control interface operating method according to the present invention. After starting the flow process 300, step 302 thereof is to select a sub-area. Please refer to FIG. 6A along with FIG. 4. A user first selects one of many sub-areas 151 in an interface allocation information map 15 shown on a display and input unit 121 of a portable electronic device 12.

Figure 6A:
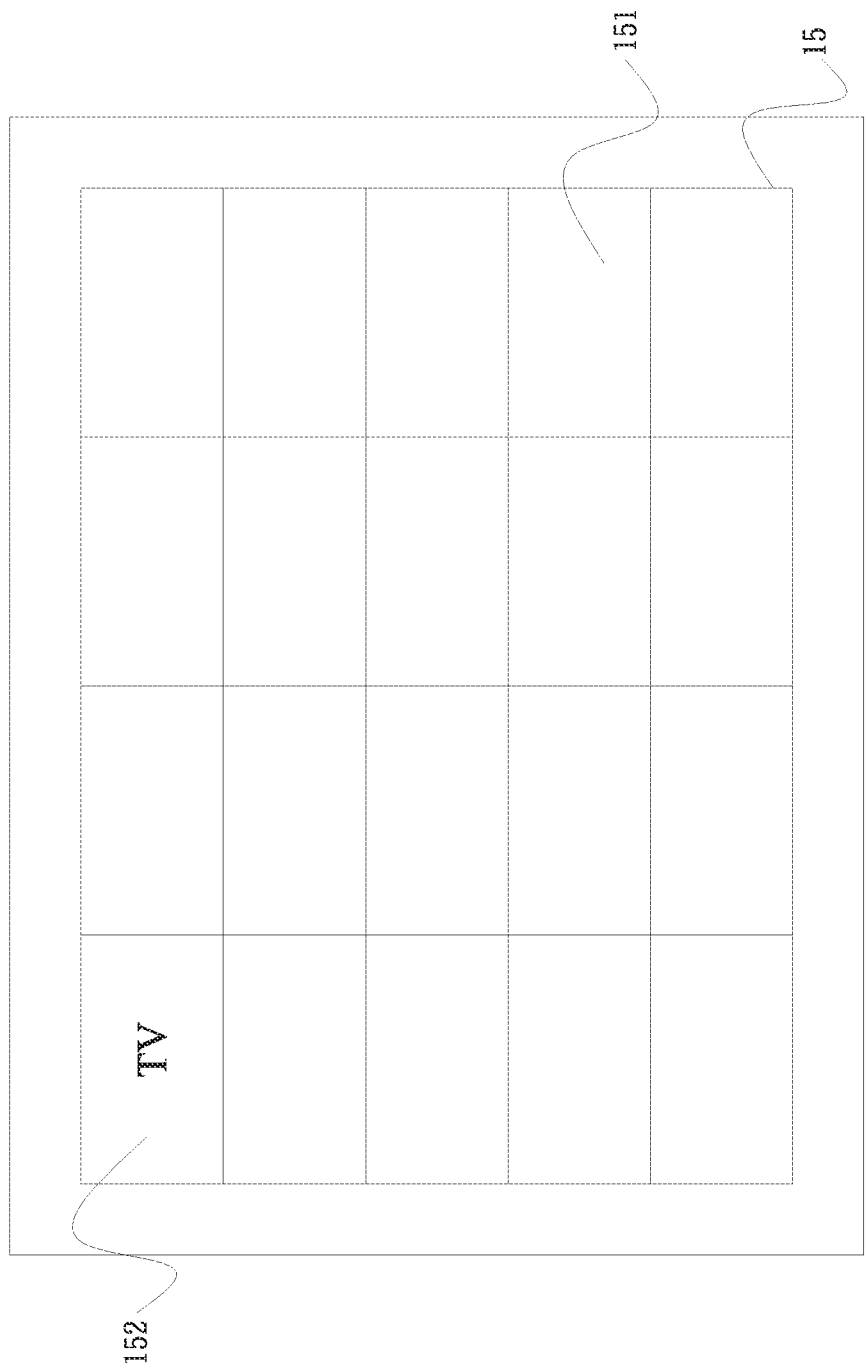

Then, go to step 303 to assign a name. In step 303, the portable electronic device 12 provides the user with a list of device names and function names, and the user selects a device name or function name from the list and assigns the selected device name or function name to the selected sub-area 151. In the illustrated embodiment, the name assigned to the selected sub-area 151 is "TV", as shown in FIG. 6A.

Then, go to step 304 whether or not to assign a remote-control code. In step 304, the selected sub-area 151 having been assigned with a name is to be defined as a button or an object. In the case the user decides not to assign a remote-control code to the selected sub-area 151, the portable electronic device 12 defines the selected sub-area 151 as an object 152, as shown in FIG. 6A, and the flow process 300 goes to step 311. The sub-area defined as an object 152 is only a name and does not correspond to any remote-control code, and is mainly used to identify and distinguish a selected device from others. On the other hand, in the case the user decides to assign a remote-control code to the selected sub-area 151, the portable electronic device 12 will define the selected sub-area 151 as a button 153, such as a button "power" 153 shown in FIG. 6B. Each button 153 is assigned with some attributes.

The attributes assigned to a button 153 can include the type, brand and model of a device to be remotely controlled with the button 153. The attributes are assigned to a button 153 in step 305 to select a device type, step 306 to select a device brand, and step 307 to select a device model, which are described in more details as below.

In step 305, the user selects a device type from a list of available device types. The available device types may include but not limited to TV, DVD player, stereo set, air conditioner and the like, and the user selects the device type according to the device to be remotely controlled with the button 153.

In step 306, the user further selects a device brand from a list of brands available from the selected device type. The user selects the device brand according to the brand of the device to be remotely controlled with the button 153.

In step 307, the user further selects a device model from a list of models available from the selected device brand. The user selects the device model according to the model of the device to be remotely controlled with the button 153.

The flow process 300 then goes to step 308 whether or not any matching remote-control code. In this step 308, as shown in FIG. 1, according to the device model selected in step 307, the portable electronic device 12 searches a network platform 11 for a built-in remote-control code that corresponds to the button 153 with the assigned attributes. In the case a corresponding built-in remote-control code is found, the corresponding built-in remote-control code is downloaded and the flow process 300 goes to step 310 to store and relate the remote-control code to its corresponding button. On the other hand, in the case no corresponding built-in remote-control code is found, the flow process 300 goes to step 309 entering into learning mode.

Please also refer to FIG. 5. In step 309 entering into learning mode, a wireless transceiver module 125 of the portable electronic device 12 receives a learning signal 211 generated by a learning object 21, which can be but not limited to a remote controller of a device to be remotely controlled with the button 153; and a processing unit 123 of the portable electronic device 12 converts the learning signal 211 into a learnt remote-control code.

In step 310 to store and relate the remote-control code to its corresponding button, the corresponding built-in remote-control code downloaded from the network platform 11 or the learnt remote-control code converted from the learning signal 211 is stored in the storage unit 122, and the processing unit 123 relates the built-in remote-control code or the learnt remote-control code to its corresponding button 153. Thereafter, the flow process 300 goes to step 311 whether or not to select a next sub-area.

In the case the user decides to select another sub-area 151 in step 311, the flow process 300 goes back to step 302, so that the user selects another sub-area 151 in the interface allocation information map 15, assigns a name to the selected sub-area 151 and defines the selected sub-area 151 as an object 152 or a button 153. On the other hand, in the case the user decides not to select another sub-area 151, the flow process 300 is ended.

An example of the system 10 and the flow process 300 of the operating method according to the present invention is now further described as below.

Please refer to FIGS. 1, 2 and 6A to 6E. In FIG. 1, it is shown the portable electronic device 12 has an interface allocation information map 15 shown on a display and input unit 121 thereof. The interface allocation information map 15 is divided into a plurality of sub-areas 151. As can be seen in FIG. 6A, a first one of the sub-areas 151 in the interface allocation information map 15 is selected and assigned with a name, which is "TV" in FIG. 6A. And then, the user selects not to define a remote-control code for the selected sub-area 151, so that the first sub-area 151 is defined by the system 10 as an object 152 and does not have any remote-control code correspond thereto. Then, the user decides to select a next sub-area.

As can be seen in FIG. 6B, the user selects a second one of the sub-areas 151 in the interface allocation information map 15 and assigns the second sub-area 151 with a name, which is "power" in FIG. 6B. Then, the user selects to define a remote-control code for the second sub-area 151, so that the selected second sub-area 151 is defined by the system 10 as a button 153. Thereafter, the user assigns attributes to the button 153, including the type, brand and model of the device to be remotely controlled with the button "power" 153. In the illustrated example, since the button 153 named as "power" is located below the object 152 named as "TV", so that the user selects "TV" as the type of the device to be remotely controlled. Then, the user further selects the brand and model that correspond to the TV to be remotely controlled. Based on these attributes, the system 10 searches the network platform 11 via the Internet 13 for a built-in remote-control code that corresponds to the attributes assigned to the button "power" 153. In the case a matching built-in remote-control code is found, which is downloaded and stored in the storage unit 122 of the portable electronic device 12, and the processing unit 123 relates the built-in remote-control code to the button "power" 153.

In the case no matching built-in remote-control code is found, the system 10 enters into a learning mode. As can be seen in FIG. 5, the portable electronic device 12 in the learning mode receives a learning signal 211 generated by a learning object 21, i.e. a remote controller of the device to be remotely controlled with the button "power" 153, and the processing unit 123 converts the received learning signal 211 into a learnt remote-control code and stores the same in the storage unit 122. The processing unit 123 further relates the learnt remote-control code to the button "power" 153.

Figure 6C:
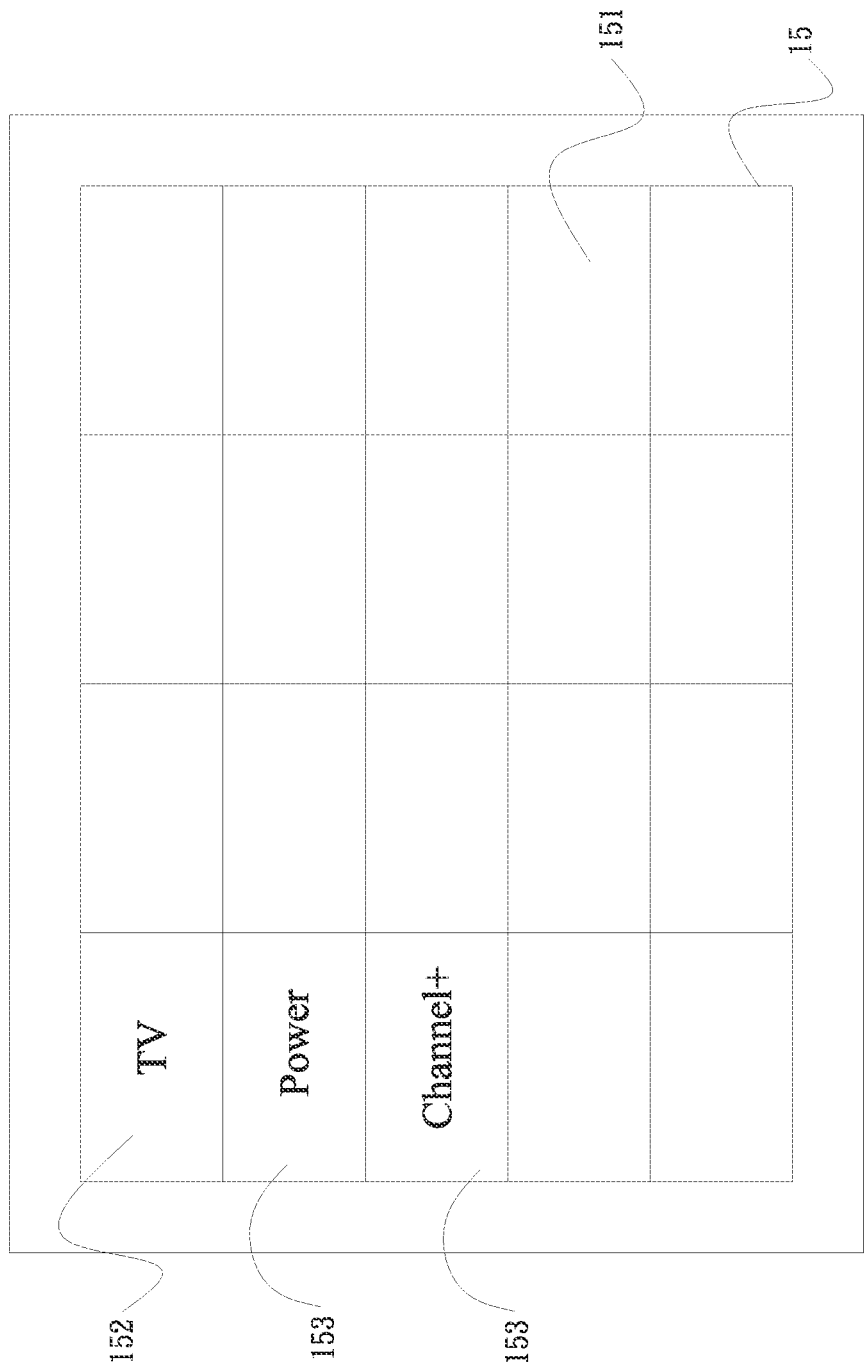

Please refer to FIG. 6C. The user may further select a third one of the sub-areas 151 in the interface allocation information map 15, and assign the third sub-area 151 with a name, which is "channel+" in FIG. 6C. Then, the user repeats the previous steps until another corresponding built-in remote-control code or another learned code is stored and related to the button "channel+" 153 in FIG. 6C.

Figure 6D:
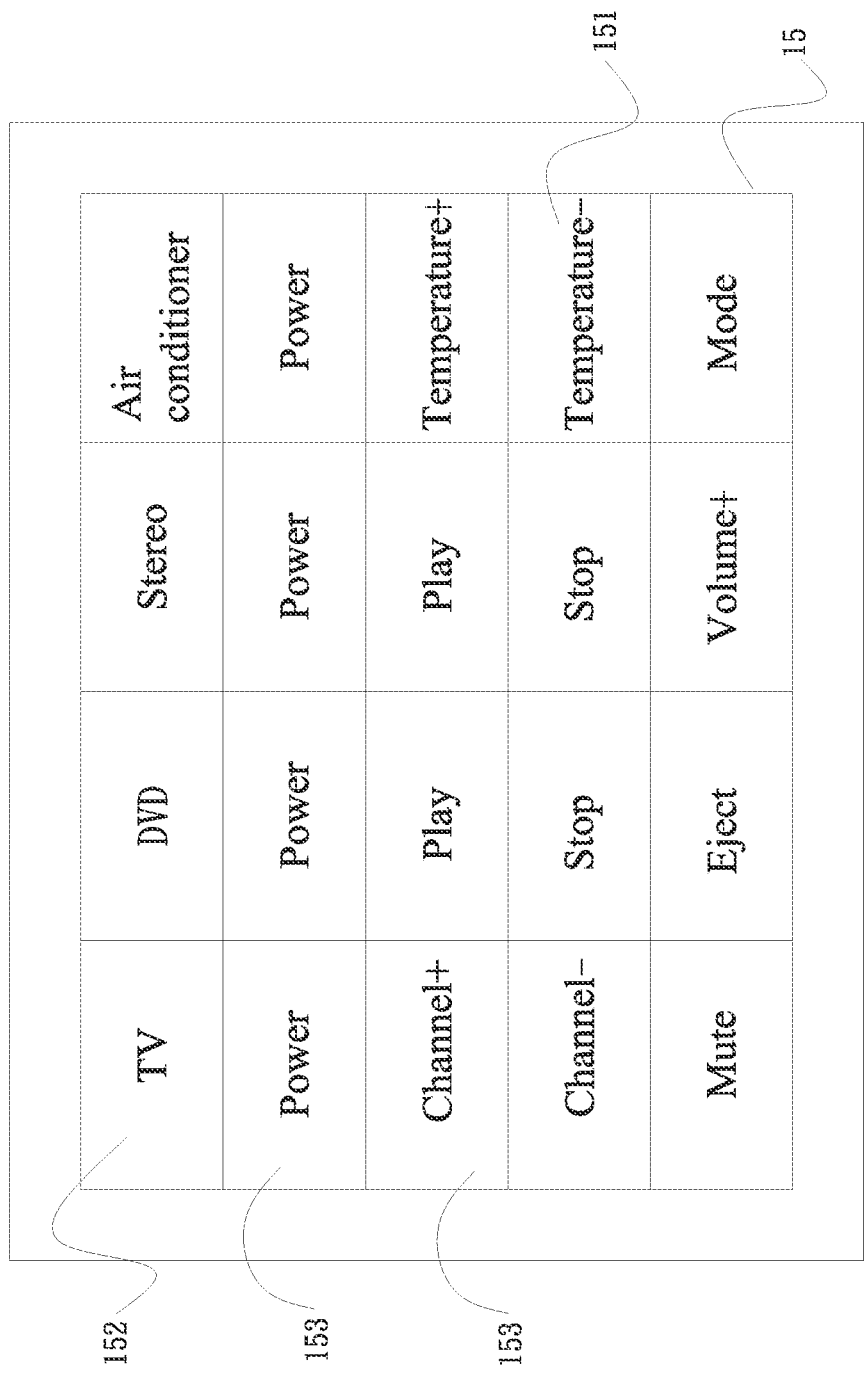

As can be seen in FIG. 6D, the previous steps can be repeated so that every sub-area 151 in the interface allocation information map 15 is defined as an object 152 or a button 153, and each sub-area 151 defined as a button 153 has a corresponding remote-control code related thereto. While the example described with reference to FIG. 6A to 6D has defined every sub-area in the interface allocation information map 15, it is understood the present invention is not necessarily implemented in the above manner. The user may select and define only a part of the sub-areas 151 according to personal requirements while leaving other sub-areas in blank. Alternatively, the user may select and define only one sub-area as an object 152, namely, a name of a device to be remotely controlled, while defining all other sub-areas as buttons 153, namely, control buttons in connection with different functions of the device to be remotely controlled.

Figure 6E:

Please refer to FIG. 6E. When the user wants to alter the definition given to one of the buttons 153 in the interface allocation information map 15, the user first selects the sub-area 151 to be changed in the definition thereof. For example, the user selects to change the sub-area 151 that is previously defined as a button "channel+" below the object "TV", as can be seen in FIG. 6D, and then assigns that sub-area 151 with a new name, which is "volume+" in FIG. 6E. The user then selects to define the sub-area 151 with the new name of "volume+" as a button 153. Thereafter, the user assigns attributes to the button "volume+" 153 by selecting the type of the device to be remotely controlled with the button "volume+" 153, which is TV in the illustrated example, and then selecting the brand and model of the device, so that the system 10, based on the user-selected device model, searches the network platform 11 via the Internet 13 for a built-in remote-control code matching the attributes assigned to the button "volume+", downloads and stores the matching built-in remote-control code in the storage unit 122 thereof, and relates the built-in remote-control code to the button "volume+" 153.

In the case no matching built-in remote-control code is found, the system 10 will then enter into the learning mode and the portable electronic device 12 receives a learning signal 211 generated by the remote controller (i.e. the object to be learned 21) of the device to be remotely controlled with the button "volume+". The processing unit 123 of the portable electronic device 12 converts the received learning signal 211 into a learnt remote-control code, stores the same in the storage unit 122, and relates the learnt remote-control code to the button "volume+" 153.

Figure 7:
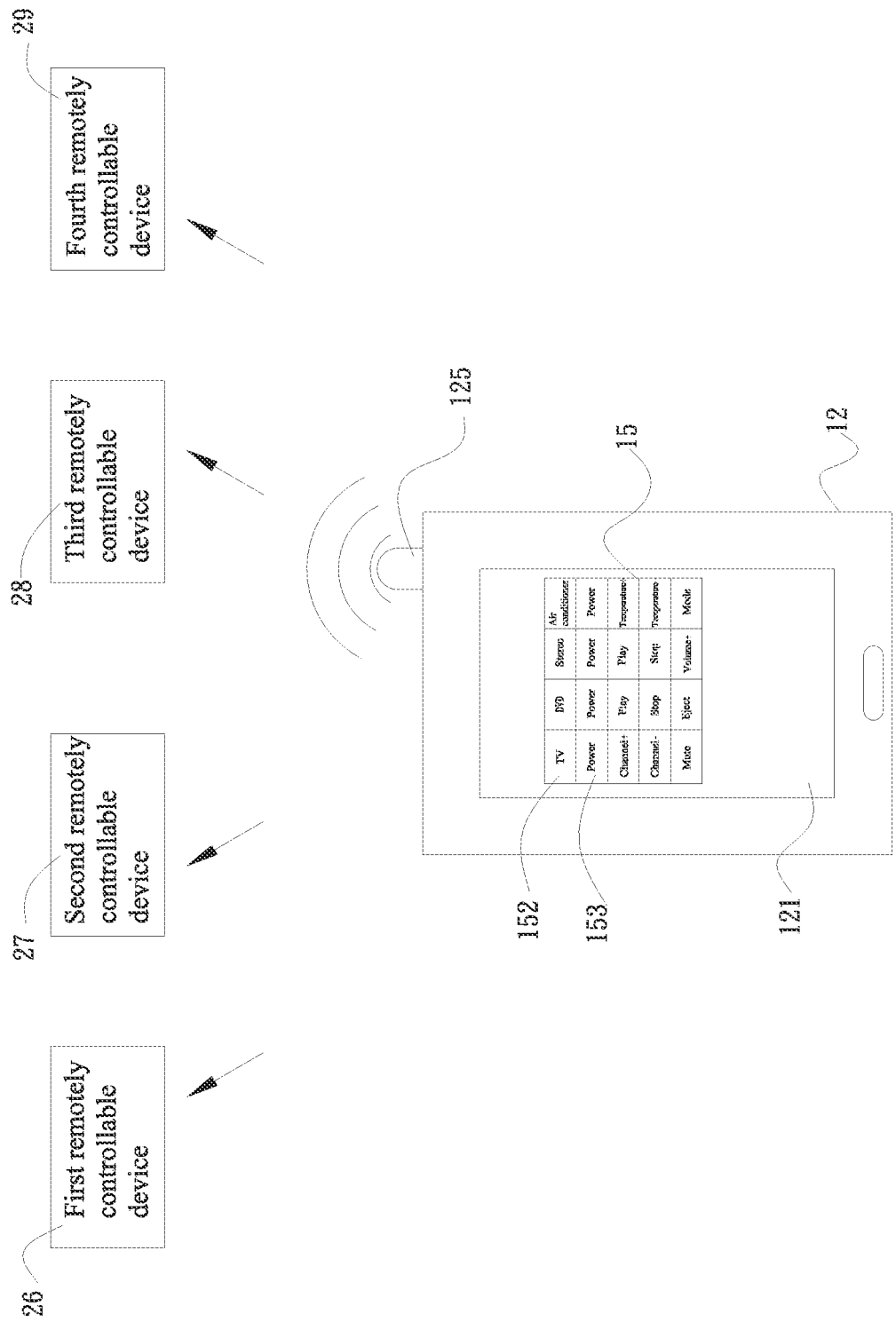
FIG. 7 is a conceptual view showing the use of the portable electronic device of the user-definable remote-control interface system according to the present invention to remotely control different devices.

Please refer to FIG. 7. When the sub-areas 151 in the interface allocation information map 15 have been properly selected and differently defined, the portable electronic device 12 can be used to transmit different remote-control signals for remotely controlling different devices via the interface allocation information map 15. In FIG. 7, four remotely controllable devices are shown, namely, a first remotely controllable device 26, a second remotely controllable device 27, a third remotely controllable device 28 and a fourth remotely controllable device 29. With the buttons 153 in the interface allocation information map 15 respectively having a corresponding built-in remote-control code or learnt remote-control code related thereto, the portable electronic device 12 can be used to remotely control the devices 26-29 to perform corresponding actions.

From the above description, the following advantages of the present invention are found:

(1) It integrates the remote-control information of a variety of devices into one single interface allocation information map;

(2) It allows a user to set a user-defined remote-control interface according to personal requirements; and (3) It enables the use of one single portable electronic device to control the remote-control interfaces of various remotely controllable devices and therefore provides excellent convenience in use.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A portable electronic device based user-definable remote-control interface system, comprising:
   a network platform having a plurality of built-in remote-control codes stored thereat; and
   a portable electronic device being wirelessly linked to the network platform and including:
   a display and input unit adapted to show an interface allocation information map; the interface allocation information map being divided into a plurality of sub-areas, each of which can be defined as one of an object and a button; any sub-area from the plurality of sub-areas defined as a button being assigned with some attributes, according to which the portable electronic device searches the network platform for one of the built-in remote-control codes from the plurality of built-in remote-control codes that corresponds to the attributes assigned to the button and downloads the corresponding built-in remote-control code, any sub-area defined as an object being only a name of a remotely controllable device and does not correspond to any of the built-in remote-control codes from the plurality of built-in remote-control codes, and is used to identify and distinguish a selected device;
   a storage unit electrically connected to the display and input unit for storing the interface allocation information map and each downloaded built-in remote-control code; and
   a processing unit electrically connected to the display and input unit as well as the storage unit, and relating each downloaded and stored built-in remote-control code to its corresponding button;
   a wireless transceiver module separable and electrically docked with the portable electronic device, the wireless transceiver module including a case, a sleeve or a barrel provided with a connector and a transmitting element, the connector correspondingly engaging with a mating connector provided on the portable electronic device; and
   wherein the interface allocation information map integrates and shows remote control information of a variety of remotely controllable devices.

2. The portable electronic device based user-definable remote-control interface system as claimed in claim 1, further comprising a wireless transceiver module connected to the portable electronic device for receiving a learning signal generated by a learning object; and the processing unit converting the learning signal into a learnt remote-control code, storing the learnt remote-control code in the storage unit, and relating the stored learnt remote-control code to a corresponding button.

3. The portable electronic device based user-definable remote-control interface system as claimed in claim 2, wherein the wireless transceiver module is selected from the group consisting of an infrared transceiver module and a radio transceiver module.

4. A method of operating portable electronic device based user-definable remote-control interface system for integrating and showing remote-control information of a variety of remotely controllable devices into one single interface allocation map, which is divided into a plurality of sub-areas and can be shown on a display and input unit of a portable electronic device; the operating method comprising the following steps:
   selecting one of the sub-areas from the plurality of sub-areas in the interface allocation information map and assigning the selected sub-area with a name in connection with one of the remotely controllable devices;
   defining the sub-area assigned with a name as one of a button and an object, if the sub-area is not assigned a remote-control code defining it as an object, and if the sub-area is assigned a remote-control code defining it as a button;
   searching a network platform for one of a plurality of built-in remote-control codes stored at the network platform that corresponds to the selected and named sub-area that is defined as a button, and downloading the corresponding built-in remote-control code from the plurality of built-in remote-control codes; and
   storing the downloaded corresponding built-in remote-control code in a storage unit of the portable electronic device and relating the built-in remote-control code to its corresponding button, if no corresponding built-in remote-control code is found for the button, the operation method goes to a next step;
   the next step causing the portable electronic device to receive a learning signal generated by a learning object, and converting the received learning signal into a learnt remote-control code, and storing the learnt remote-control code in the storage unit and relating the learnt remote-control code to its corresponding button;
   then returning to the step of selecting a sub-area in the case of another sub-area from the plurality of sub-areas in the interface allocation information map; and
   ending the operation method in the case where no other sub-area from the plurality of sub-areas in the interface allocation information map is to be selected.

5. The operating method as claimed in claim 4, wherein the object to be learned is a remote controller of a device to be remotely controlled with the button.

6. The operating method as claimed in claim 4, wherein the network platform is a server.

7. The operating method as claimed in claim 4, wherein the button is assigned with some attributes, and the attributes include a type, a brand and a model of the device to be remotely controlled with the button.

8. The operating method as claimed in claim 7, further comprising the following steps for assigning attributes to the button:
   selecting a device type that corresponds to the device to be remotely controlled with the button;
   selecting a device brand from various brands available from the selected device type; and
   selecting a device model from various models available from the selected device brand.

* * * * *